(12) United States Patent
Ho et al.

(10) Patent No.: US 8,860,036 B2
(45) Date of Patent: Oct. 14, 2014

(54) PIXEL ELECTRODE STRUCTURE AND DISPLAY USING THE SAME

(71) Applicant: InnoLux Corporation, Miao-Li County (TW)

(72) Inventors: Yu-Sheng Ho, Miao-Li County (TW); Ying-Jen Chen, Miao-Li County (TW); Ching-Che Yang, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 13/966,432

(22) Filed: Aug. 14, 2013

(65) Prior Publication Data

US 2014/0103350 A1 Apr. 17, 2014

(30) Foreign Application Priority Data

Oct. 11, 2012 (TW) .............................. 101137419 A

(51) Int. Cl.
*H01L 29/423* (2006.01)
*H01L 29/786* (2006.01)
*G02F 1/1362* (2006.01)

(52) U.S. Cl.
CPC ................................ *G02F 1/136286* (2013.01)
USPC ............................................................ 257/72

(58) Field of Classification Search
USPC ........................... 257/40, 43, 59, 72; 438/151
See application file for complete search history.

(56) References Cited

U.S. PATENT DOCUMENTS

2012/0105785 A1* 5/2012 Kim et al. ..................... 349/139

* cited by examiner

*Primary Examiner* — Daniel Shook
(74) *Attorney, Agent, or Firm* — Bacon & Thomas, PLLC

(57) ABSTRACT

The present invention relates to a pixel electrode structure, comprising: at least one scanning line disposed on a substrate; at least one data line disposed on the substrate and intersecting the scanning line to define a pixel area; a pixel electrode disposed in the pixel area; an active element comprising a gate electrode, a source electrode and a drain electrode, wherein the gate electrode is electrically connected to the scanning line, the source electrode is electrically connected to the data line, and the drain electrode is electrically connected to the pixel electrode; and a shielding electrode overlapping one side of the scanning line and electrically connected to the pixel electrode with a first connecting part, wherein the shielding electrode has a jag structure, and the first connecting part is disposed at a junction between jags of the jag structure protruding in different orientations.

10 Claims, 6 Drawing Sheets

PIXEL ELECTRODE STRUCTURE AND DISPLAY USING THE SAME

CROSS REFERENCE TO RELATED APPLICATION

This application claims the benefits of the Taiwan Patent Application Serial Number 101137419, filed on Oct. 11, 2012, the subject matter of which is incorporated herein by reference.

BACKGROUND OF THE INVENTION

1. Field of the Invention

The present invention relates to a pixel electrode structure for a liquid crystal display, and more particularly to a pixel electrode structure for a liquid crystal display having improved aperture ratio while preventing light leakage of a scanning line.

2. Description of Related Art

Development of the display has evolved from cathode ray tubes to transistor liquid crystal displays. Now, the liquid crystal displays (LCDs) are divided into twist nematic LCDs, super twist nematic LCDs, thin film transistor LCDs, and low-temperature polysilicon LCDs. A thin film transistor liquid crystal display and a low-temperature polysilicon liquid crystal display are advantageously used in a full-color LCD, a notebook computer, and a liquid crystal display television because of its large-size, high contrast, and long service life, so that the liquid crystal display has become the mainstream. A commercially available LCD usually has the light leakage problem, and one of the main factors thereof is the electric field between the pixel electrode and the scanning lines which causes an abnormal orientation of liquid crystals in this area and results in light leakage. Although there have been many techniques for improving light leakage, few of them can improve light leakage of the scanning line effectively.

In addition, common techniques for improving light leakage will reduce aperture ratio of the pixel. Because the aperture ratio of the pixel is directly proportional to luminance and utilization rate of backlight source, the issue of energy consumption arises in the liquid crystal display when aperture ratio is reduced.

Therefore, an important research direction for improving the quality of the liquid crystal display is to provide a method for solving the problem of light leakage of a scanning line while at the same time, increasing aperture ratio.

SUMMARY OF THE INVENTION

An object of the present invention is to provide a pixel electrode structure for preventing light leakage of a scanning line while increasing aperture ratio.

Another object of the present invention is to provide a display panel including the above-mentioned pixel electrode structure to improve the display quality of the display panel.

To achieve the above object, the present invention provides a pixel electrode structure, comprising: at least one scanning line disposed on a substrate; at least one data line disposed on the substrate and intersecting the scanning line to define a pixel area; a pixel electrode disposed in the pixel area; an active element comprising a gate electrode, a source electrode and a drain electrode, wherein the gate electrode is electrically connected to the scanning line, the source electrode is electrically connected to the data line, and the drain electrode is electrically connected to the pixel electrode; and a shielding electrode overlapping one side of the scanning line and electrically connected to the pixel electrode with a first connecting part, wherein the shielding electrode has a jag structure, and the first connecting part is disposed at a junction between jags of the jag structure protruding in different orientations. Hence, the influence on the tilt direction of liquid crystals in the pixel area can be avoided, and thereby the generation of dark lines can be prevented.

Because the shielding electrode may optionally be electrically connected to the pixel electrode with a first connecting part, in the case that the pixel electrode structure includes the first connecting part, the shielding electrode may be electrically connected to the pixel electrode with the first connecting part. In the case that the pixel electrode structure does not include the first connecting part, the shielding electrode may be disposed in two configurations. In one configuration, the shielding electrode may be connected to a common electrode for storage capacitor in the pixel electrode structure, and thus the shielding electrode has a common potential. In the other configuration, the shielding electrode is in a floating state to simply shield the gate electric field.

In the pixel electrode structure of the present invention, at least one side of the shielding electrode has a jag structure, or alternatively, both sides of the shielding electrode have a jag structure.

A jag structure mainly includes a main axis in parallel with the scanning line and a plurality of jags, wherein the jag structure of the present invention may include a plurality of jags protruding from the main axis preferably at an angle of 30-60°, preferably at an angle of 35-55°, and more preferably at an angle of 45°. Besides, in pixel electrode structure of the present invention, if the both sides of the shielding electrode have a jag structure, the arrangement of the jags at the two sides is not particularly limited, preferably symmetrical or alternate with each other, and more preferably alternate with each other.

In addition, in pixel electrode structure of the present invention, the shielding electrode further comprises a first shielding part and a second shielding part, and the first shielding part overlaps one side of the scanning line and electrically connected to the pixel electrode with a first connecting part while the second shielding part overlaps the other side of the scanning line. In an embodiment, the shielding electrode may be disposed in a floating state or further connected to a common electrode. When the second shielding part is connected to a common electrode, the second shielding part may have a common potential. When the second shielding part is in a floating state, it simply functions to shield the gate electric field.

In the shielding electrode, a second connecting part may be further included between the first shielding part and the second shielding part for connection thereof, such that the shielding electrode forms an "I" shape.

In addition, when the shielding electrode of the present invention is electrically connected to the pixel electrode with the first connecting part, the shielding electrode, the first connecting part and the pixel electrode may be made of the same material, and the shielding electrode of the present invention may be a transparent electrode.

In addition to above configurations of the pixel electrode of the present invention, another configuration is also provided in the present invention. The another pixel electrode of the present invention comprises a plurality of data lines disposed on a substrate in parallel, wherein a pixel area is defined by the adjacent data lines; a pixel electrode disposed in the pixel area; a scanning line disposed on the substrate and intersecting the data lines, wherein the scanning line crosses over the pixel electrode or is disposed between the adjacent pixel electrodes; an active element disposed in the pixel area, which comprises a gate electrode, a source electrode and a drain electrode, wherein the gate electrode is electrically connected to the scanning line, the source electrode is electrically connected to the data lines, and the drain electrode is electrically connected to the pixel electrode; and a shielding electrode electrically connected to the pixel electrode with a first connecting part, wherein the first connecting part is disposed at a junction between liquid crystals having different tilt directions in the pixel area. Hence, the influence on the tilt direction of liquid crystals in the pixel area can be avoided, and thereby the generation of dark lines can be prevented. Herein the shielding electrode further comprises a first shielding part and a second shielding part, and the first shielding part overlaps one side of the scanning line while the second shielding part overlaps the other side of the scanning line. As described above, the shielding electrode may be disposed in a floating state or further connected to a common electrode. When the second shielding part is connected to a common electrode, the second shielding part may have a common potential. When the second shielding part is in a floating state, it simply functions to shield the gate electric field. Furthermore, a second connecting part may be further included between the first shielding part and the second shielding part for connection thereof, such that the shielding electrode forms an "I" shape.

In the further provided configuration of the pixel electrode according to the present invention, when the scanning line crosses over the pixel electrode, the pixel electrode may be defined as a first pixel electrode part and a second pixel electrode part, wherein the first shielding part overlaps one side of the scanning line and is electrically connected to the first pixel electrode part with the first connecting part, while the second shielding part overlaps the other side of the scanning line. When a second connecting part is further included between the first shielding part and the second shielding part, the first shielding part is thereby connected to the second shielding part with the second connecting part.

In the further provided configuration of the pixel electrode according to the present invention, at least one side of the first or second shielding electrode has a jag structure, or alternatively, both sides of the first or second shielding electrode have a jag structure. The jag structure mainly includes a main axis in parallel with the scanning line and a plurality of jags, wherein the jag structure of the present invention may include a plurality of jags protruding from the main axis at an angle of 30-60°, preferably at an angle of 35-55°, and more preferably at an angle of 45°. Besides, in the pixel electrode structure of the present invention, if the both sides of the first or second shielding electrode have a jag structure, the arrangement of the jags at the two sides is not particularly limited, preferably symmetrical or alternate with each other, and more preferably alternate with each other.

In the further provided configuration according to the present invention, the shielding electrode and the pixel electrode may be made of the same material, and the shielding electrode of the present invention may be a transparent electrode.

The present invention also provides a display panel, comprising a pixel electrode structure which comprises: at least one scanning line disposed on a substrate; at least one data line disposed on the substrate and intersecting the scanning line to define a pixel area; a pixel electrode disposed in the pixel area; an active element comprising a gate electrode, a source electrode and a drain electrode, wherein the gate electrode is electrically connected to the scanning line, the source electrode is electrically connected to the data line, and the drain electrode is electrically connected to the pixel electrode; and a shielding electrode overlapping one side of the scanning line and electrically connected to the pixel electrode with a first connecting part, wherein the shielding electrode has a jag structure, and the first connecting part is disposed at a junction between jags of the jag structure protruding in different orientations. Hence, the influence on the tilt direction of liquid crystals in the pixel area can be avoided, and thereby the generation of dark lines cam be prevented.

Here, both sides of the shielding electrode may have a jag structure, and the jags of the jag structure of the both sides of the shielding electrode are symmetrical or alternate with each other. In addition, the jag structure may include a plurality of jags protruding from the main axis at an angle of 30-60°, preferably at an angle of 35-55°, and more preferably at an angle of 45°.

In the display panel of the present invention, the shielding electrode may further comprise a first shielding part and a second shielding part, wherein the first shielding part overlaps one side of the scanning line and is electrically connected to the pixel electrode with a first connecting part, while the second shielding part overlaps the other side of the scanning line. In an embodiment, the second shielding part may be disposed in a floating state or further connected to a common electrode. When the second shielding part is connected to a common electrode, the second shielding part may have a common potential. When the second shielding part is in a floating state, it simply functions to shield the gate electric field. In addition, in the shielding electrode, a second connecting part may be further included between the first shielding part and the second shielding part for connection thereof, such that the shielding electrode forms a "I" shape.

Other objects, advantages, and novel features of the invention will become more apparent from the following detailed description when taken in conjunction with the accompanying drawings.

DETAILED DESCRIPTION OF THE PREFERRED EMBODIMENT

While the invention has been described in detail and with reference to specific embodiments thereof, it is to be understood that the foregoing description is exemplary and explanatory in nature and is intended to illustrate the invention and its preferred embodiments. Through routine experimentation, one skilled in the art will readily recognize that various changes and modifications can be made therein without departing from the spirit and scope of the invention. Thus, the invention is intended to be defined not by the above description, but by the following claims and their equivalents.

Embodiment 1

Figure 1:
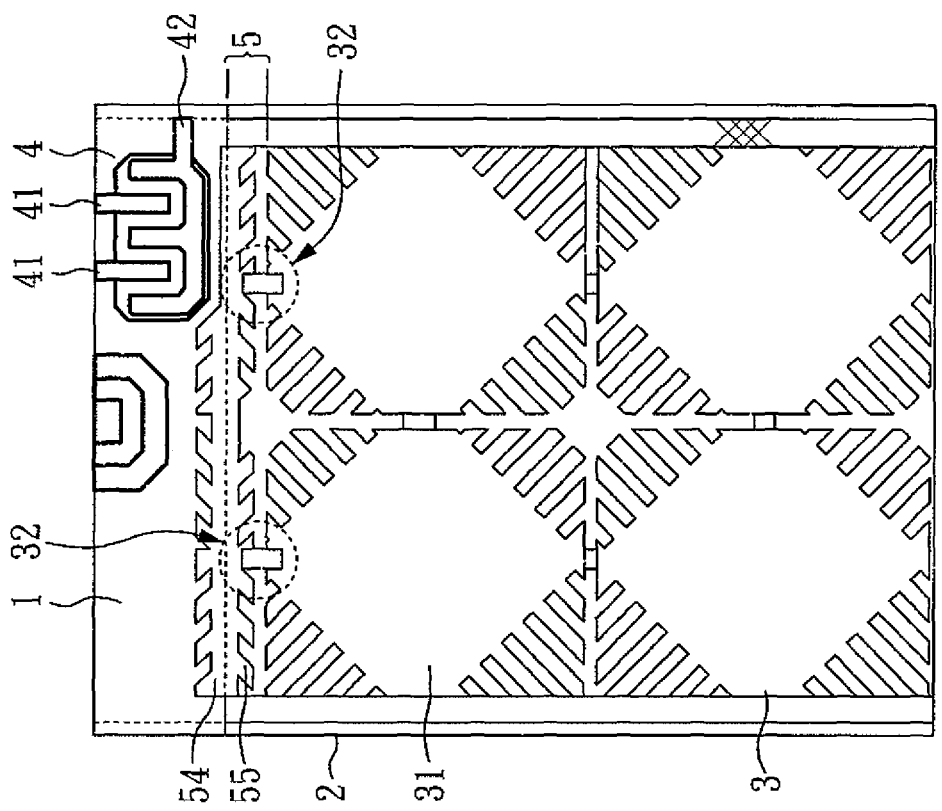
FIG. 1 shows the schematic diagram of the pixel electrode structure of Embodiment 1 according to the present invention.

Please refer to FIG. 1, which shows the schematic diagram of the pixel electrode structure of Embodiment 1 according to the present invention, wherein the pixel electrode structure comprises: at least one scanning line 1 disposed on a substrate (not shown); at least one data line 2 disposed on the substrate (not shown) and intersecting the scanning line 1 orthogonally or non-orthogonally, to define a pixel area 3; a pixel electrode 31 disposed in the pixel area 3, wherein the pixel electrode 31 has a "*" shaped pattern; an active element 4 comprising a gate electrode (not shown), a source electrode 42 and a drain electrode 41, wherein the gate electrode (not shown) is electrically connected to the scanning line 1, the source 42 is electrically connected to the data line 2, and the drain 41 is electrically connected to the pixel electrode 31; and a shielding electrode 5 overlapping one side of the scanning line 1 and electrically connected to the pixel electrode 31 with a first connecting part 32, wherein only one side of the shielding electrode 5 has a jag structure, and the jag structure includes a main axis 54 in parallel with the scanning line 1 and a plurality of jags 55, wherein the plurality of jags 55 protrudes from the main axis 54 at an angle of 45°. In addition, the first connecting part 32 is disposed at a junction between jags 55 of the jag structure protruding in different orientations. Hence, the influence on the tilt direction of liquid crystals in the pixel area can be avoided, and thereby the generation of dark lines can be prevented.

In this embodiment, the shielding electrode 5, the first connecting part 32, and the pixel electrode 31 are made of an indium tin oxide (ITO) transparent electrode, and the shielding electrode 5 overlaps the scanning line 1 to shield electric field of the scanning line 1.

When observing light leakage of the pixel electrode structure according to the present invention and a conventional pixel electrode structure, light leakage at the edge of the pixel according to the present invention is absent, and aperture ratio is significantly increased.

Embodiment 2

Figure 2:
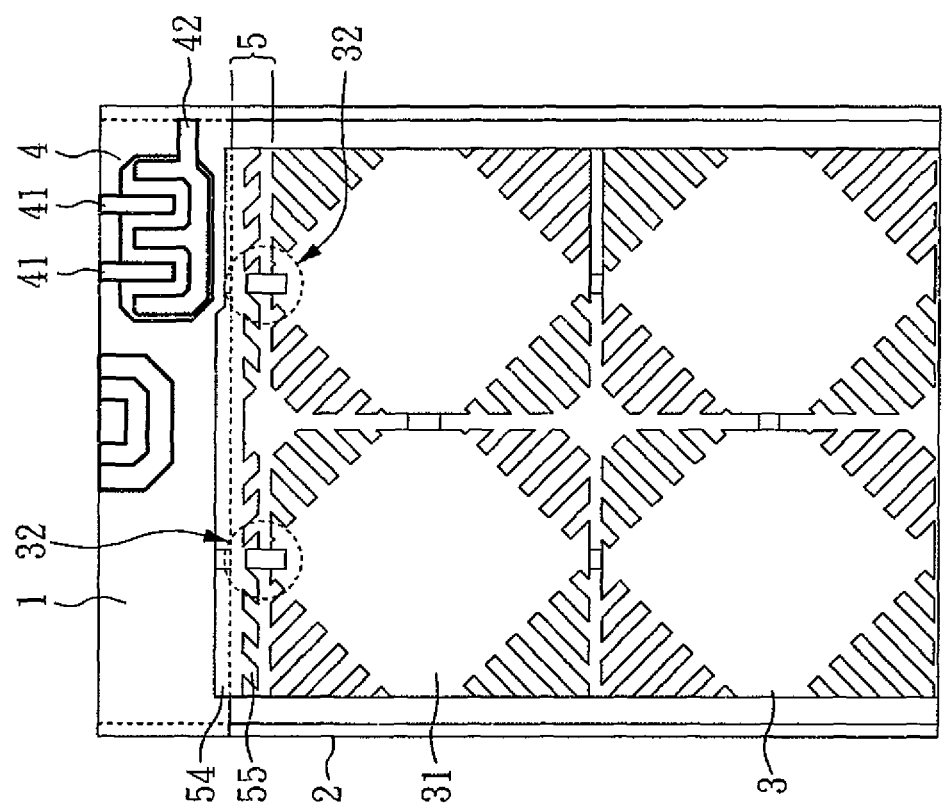
FIG. 2 shows the schematic diagram of the pixel electrode structure of Embodiment 2 according to the present invention.

Please refer to FIG. 2, which shows the schematic diagram of the pixel electrode structure of Embodiment 2 according to the present invention. The pixel electrode structure of Embodiment 2 is substantially the same as that in Embodiment 1, except that both sides of the shielding electrode 5 have a jag structure, and the jag structure includes a plurality of jags 55 protruding from the main axis 54 at an angle of 45°.

When examining light leakage of the pixel electrode structure of this embodiment, and light leakage at the edge of the pixel is also absent, and aperture ratio is significantly increased.

Embodiment 3

Figure 3:
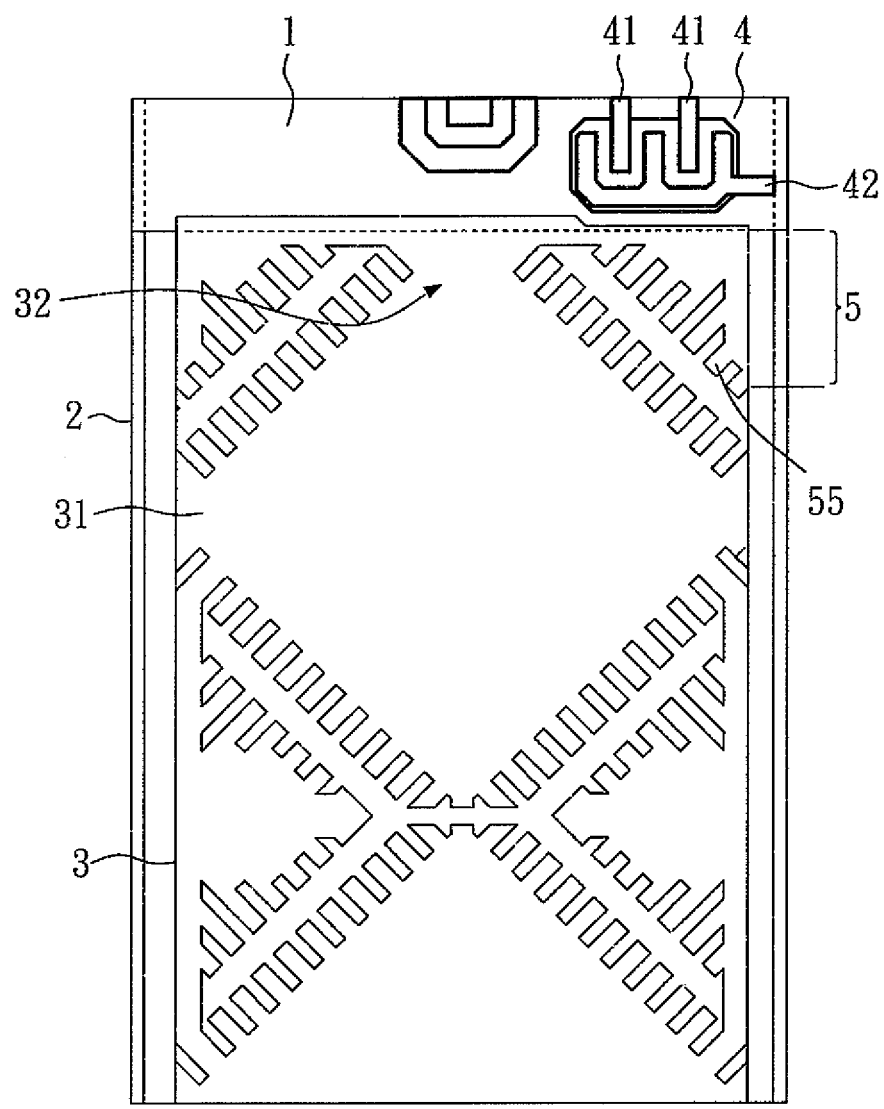
FIG. 3 shows the schematic diagram of the pixel electrode structure of Embodiment 3 according to the present invention.

Please refer to FIG. 3, which shows the schematic diagram of the pixel electrode structure of Embodiment 3 according to the present invention. The pixel electrode structure of Embodiment 3 is substantially the same as that in Embodiment 1, except for the "*" shaped pattern of the pixel electrode 31. The shielding electrode 5 in this embodiment has a jag structure corresponding to the pattern of the pixel electrode 31, which is different from that in Embodiment 1. In addition, the first connecting part 32 is disposed at a junction between the jags 55 protruding in different orientations in the jag structure of the shielding electrode 5. Hence, the influence on the tilt direction of liquid crystals in a pixel can be avoided, and thereby the generation of dark lines can be prevented.

When examining light leakage of the pixel electrode structure of this embodiment, light leakage at the edge of the pixel is also absent, and aperture ratio is significantly increased.

Embodiment 4

Figure 4:
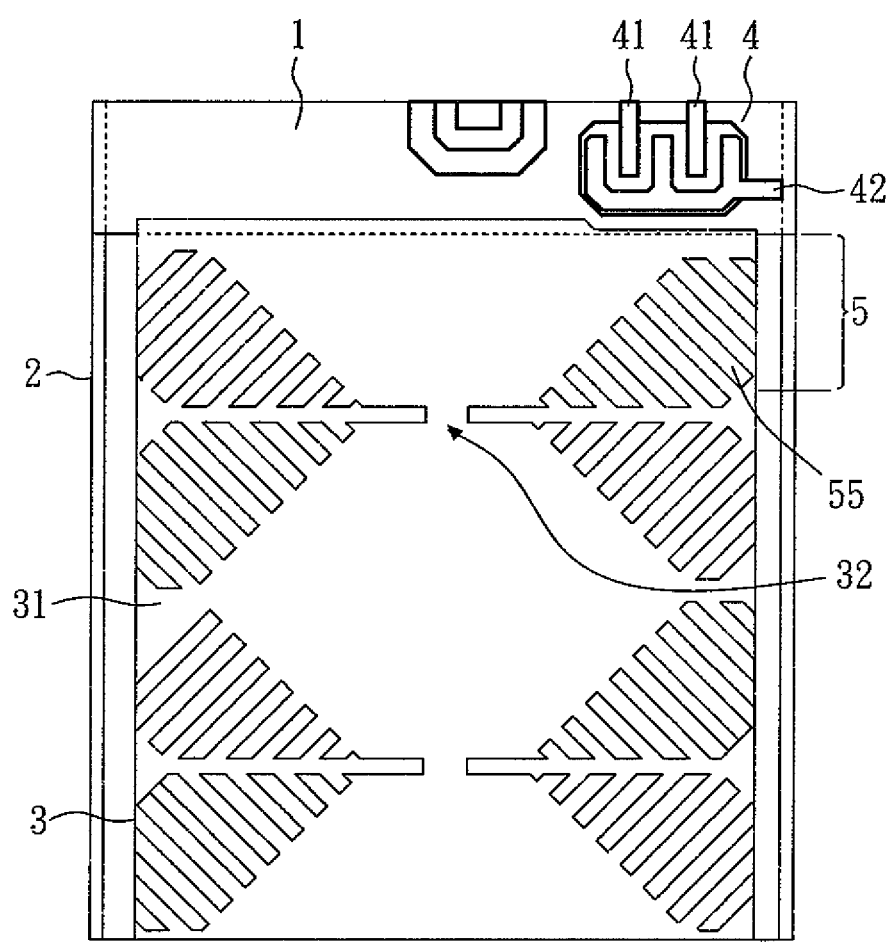
FIG. 4 shows the schematic diagram of the pixel electrode structure of Embodiment 4 according to the present invention.

Please refer to FIG. 4, which shows the schematic diagram of the pixel electrode structure of Embodiment 4 according to the present invention. The pixel electrode structure of Embodiment 4 is substantially the same as that in Embodiment 3, except for the "*" shaped patterns of the pixel electrode 4. In addition, the shielding electrode 5 in this embodiment has a jag structure in which the jags are symmetrical to the pixel electrode 31. In addition, the first connecting part 32 is disposed at a junction between the jags 55 protruding in different orientations in the jag structure of the shielding electrode 5. Hence, the influence on the tilt direction of liquid crystals in the pixel area can be avoided, and thereby the generation of dark lines can be prevented.

When examining light leakage of the pixel electrode structure of this embodiment, light leakage at the edge of the pixel according to the present invention is also absent, and aperture ratio is significantly increased.

Embodiment 5

Figure 5:
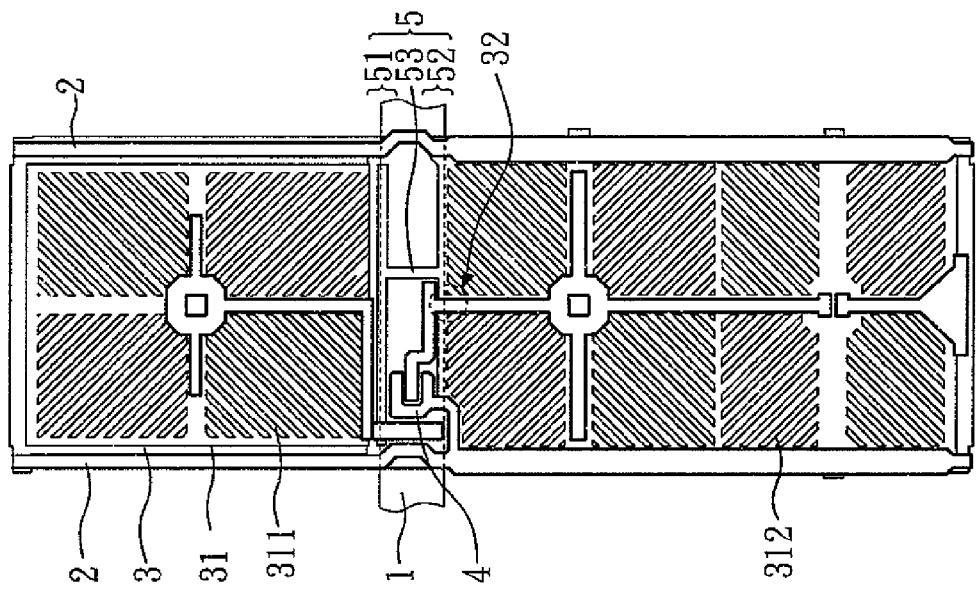
FIG. 5 shows the schematic diagram of the pixel electrode structure of Embodiment 5 according to the present invention.

Please refer to FIG. 5, which shows the schematic diagram of the pixel electrode structure of Embodiment 5 according to the present invention. The difference between the pixel electrode structures in this embodiment and the above-mentioned embodiments is that the scanning lines 1 in this embodiment crosses over the pixel electrode structure to divide the pixel electrode 31 into a first pixel electrode part 311 and a second pixel electrode part 312. Furthermore, the shielding electrode 5 of this embodiment comprises a first shielding part 51, a second shielding part 52, and a second connecting part 53, wherein the first shielding part 51 overlaps one side of the scanning line 1 while the second shielding part 52 overlaps the other side of the scanning line 1, and the second shielding part 52 is connected to the first shielding part 51 with the second connecting part 53, such that the shielding electrode is formed in an "I" shape. In addition, the shielding electrode 5 in an "I" shape has a jag structure which may be identical to the Embodiments 1 and 2. Furthermore, the first connecting part 32 is electrically connected to the second pixel electrode part 312 and the shielding electrode 5, wherein the first connecting part 32 is disposed at a junction between the jags protruding in different orientations in the jag structure. Hence, the influence on the tilt direction of liquid crystals in a pixel can be avoided, and thereby the generation of dark lines can be prevented. In this embodiment, the jag structure of the shielding electrode 5 is the same as that in Embodiment 1.

When examining light leakage of the pixel electrode structure in this embodiment, light leakage at the edge of the pixel according to the present invention is also absent, and aperture ratio is significantly increased.

Embodiment 6

Figure 6:
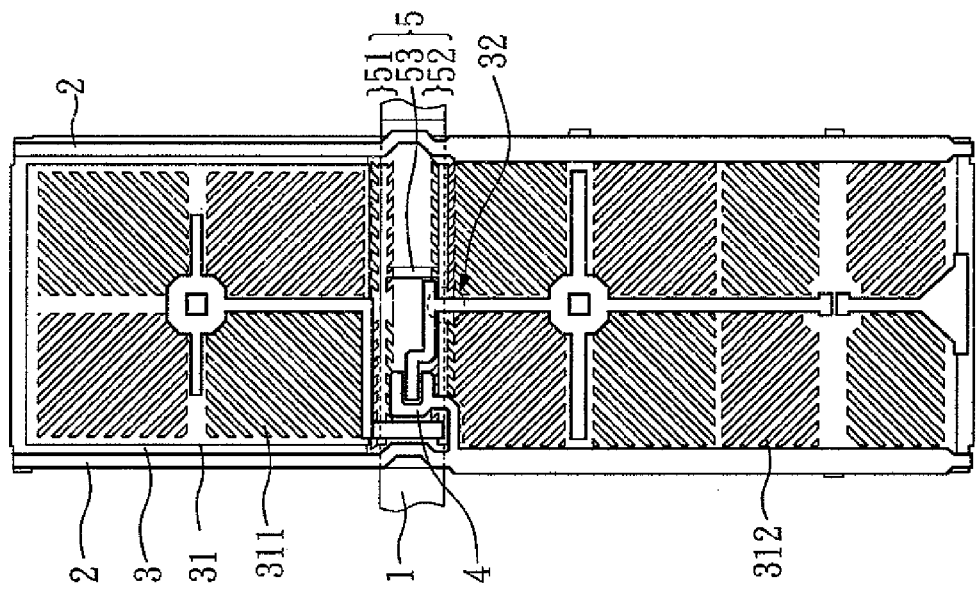
FIG. 6 shows the schematic diagram of the pixel electrode structure of Embodiment 6 according to the present invention.

Please refer to FIG. 6, which shows the schematic diagram of the pixel electrode structure of Embodiment 6 according to the present invention, wherein the pixel electrode structure comprises: a plurality of data lines 2 disposed on a substrate (not shown) in parallel, wherein a pixel area 3 is defined by the adjacent data lines 2; a pixel electrode 31 disposed in the pixel area 3; a scanning line 1 disposed on a substrate (not shown), which intersects the data lines 2 and crosses over the pixel electrode 31 to divide the pixel electrode 31 into a first pixel electrode part 311 and a second pixel electrode part 312; an active element 4 disposed in the pixel area 3 and comprising a gate electrode, a source electrode and a drain electrode, wherein the gate electrode is electrically connected to the scanning line 1, the source electrode is electrically connected to the data lines 2, and the drain electrode is electrically connected to the pixel electrode 31; and a shielding electrode 5. The shielding electrode 5 of this embodiment is connected to the second pixel electrode part 312 with a first connection part 32, and the first connecting part 32 is disposed at a position where the influence on the tilt direction of liquid crystals can be avoided, namely, at a junction between liquid crystals having different tilt directions in pixel area. In this embodiment, the shielding electrode 5 comprises a first shielding part 51, a second shielding part 52, and a second connecting part 53, wherein the first shielding part 51 overlaps one side of the scanning line 1 while the second shielding part 52 overlaps the other side of the scanning line 1, and the second shielding part 52 is connected to the first shielding part 51 with the second connecting part 53. Thereby, the shielding electrode is formed in an "I" shape.

When examining light leakage of the pixel electrode structure of this embodiment, light leakage at the edge of the pixel according to the present invention is also absent, and aperture ratio is significantly increased.

Embodiment 7

Figure 7:
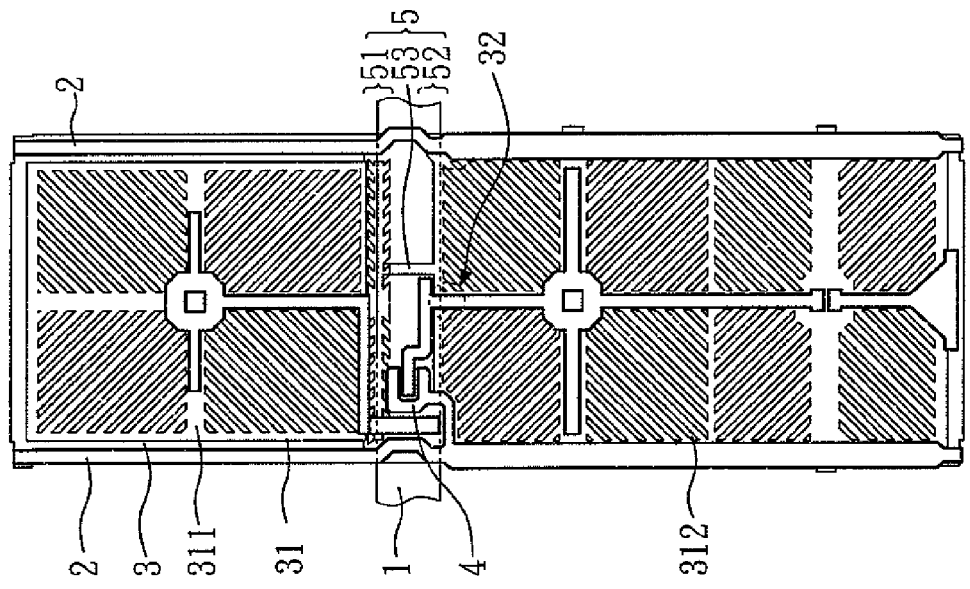
FIG. 7 shows the schematic diagram of the pixel electrode structure of Embodiment 7 according to the present invention.

Please refer to FIG. 7, which shows the schematic diagram of the pixel electrode structure of Embodiment 7 according to the present invention. The pixel electrode structure of Embodiment 7 is substantially the same as that in Embodiment 6, except that the first shielding part 51 of this embodiment has a jag structure, and the jag structure of the shielding electrode 5 includes the jags protruding from the main axis 54 at an angle of 45° as that in Embodiment 1. In addition, the first connection part 32 of this embodiment electrically connects to the second pixel electrode part 312 and the second shielding part 52.

When examining light leakage of the pixel electrode structure in this embodiment, light leakage at the edge of the pixel according to the present invention is also similarly not present, and aperture ratio is significantly increased.

Embodiment 8

Figure 8:
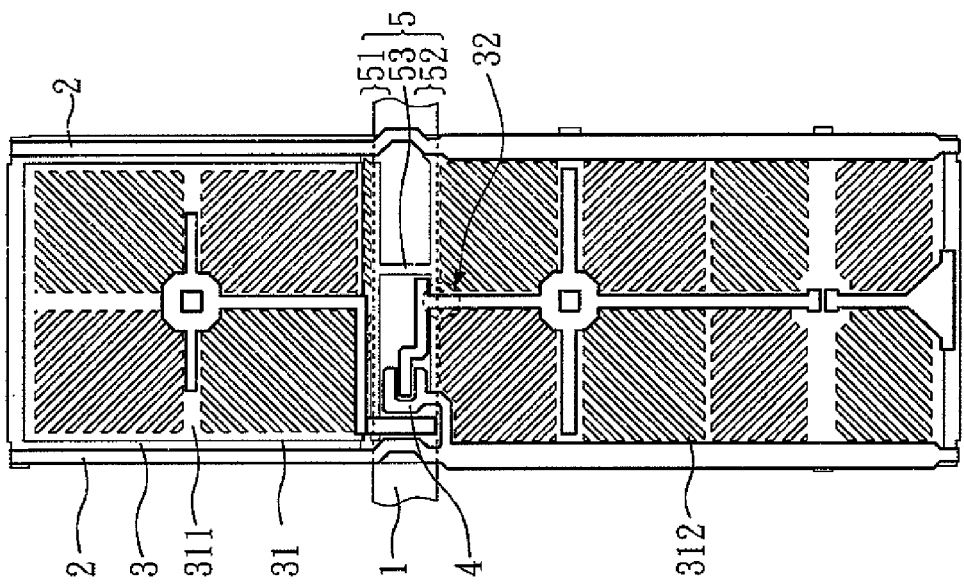
FIG. 8 shows the schematic diagram of the pixel electrode structure of Embodiment 8 according to the present invention.

Please refer to FIG. 8, which shows the schematic diagram of the pixel electrode structure of Embodiment 8 according to the present invention. The pixel electrode structure of Embodiment 8 is substantially the same as that in Embodiment 7, except that both sides of the first shielding part 51 of the shielding electrode 5 have a jag structure, and the jag structures of the both sides are symmetrical to each other.

When examining light leakage of the pixel electrode structure of this embodiment, light leakage at the edge of the pixel according to the present invention is also absent, and aperture ratio is significantly increased.

Embodiment 9

Figure 9:
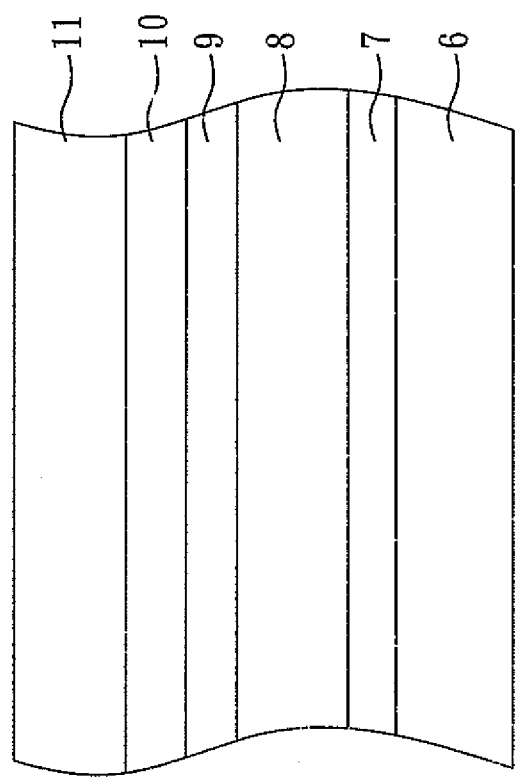
FIG. 9 shows the schematic diagram of the display panel of Embodiment 9 according to the present invention.

Please refer to FIG. 9, which shows the schematic diagram of the display panel of Embodiment 9 according to the present invention. The construction of the display panel in this embodiment comprises a first substrate layer 6, a pixel layer 7, a liquid crystal layer 8, an electrode layer 9, a filter layer 10, and a second substrate layer 11, wherein pixel layer 7 of this embodiment includes the pixel electrode structure according to the present invention, and may include any one of the pixel electrode structures in Embodiments 1-8.

By using the pixel electrode structure of the present invention, light leakage may be reduced, and the aperture ratio of the pixel may be further increased, thereby improving the utilization rate of backlight source, increasing luminance of the panel, and thus realizing energy saving.

Although the present invention has been explained in relation to its preferred embodiment, it is to be understood that many other possible modifications and variations can be made without departing from the spirit and scope of the invention as hereinafter claimed.

What is claimed is:

1. A pixel electrode structure, comprising:
   at least one scanning line disposed on a substrate;
   at least one data line disposed on the substrate and intersecting the scanning line to define a pixel area;
   a pixel electrode disposed in the pixel area;
   an active element comprising a gate electrode, a source electrode and a drain electrode, wherein the gate electrode is electrically connected to the scanning line, the source electrode is electrically connected to the data line, and the drain electrode is electrically connected to the pixel electrode; and
   a shielding electrode overlapping one side of the scanning line and electrically connected to the pixel electrode with a first connecting part, wherein the shielding electrode has a jag structure, and the first connecting part is disposed at a junction between jags of the jag structure protruding in different orientations.

2. The pixel electrode structure of claim 1, wherein at least one side of the shielding electrode has a jag structure.

3. The pixel electrode structure of claim 1, wherein both sides of the shielding electrode have a jag structure.

4. The pixel electrode structure of claim 3, wherein the jags of the jag structure of the both sides of the shielding electrode are symmetrical or alternate with each other.

5. The pixel electrode structure of claim 1, wherein the jag structure has a plurality of jags protruding from a main axis at an angle of 30-60°.

6. The pixel electrode structure of claim 1, wherein the shielding electrode further comprises a first shielding part and a second shielding part, and the first shielding part overlaps one side of the scanning line and electrically connected to the pixel electrode with the first connecting part while the second shielding part overlaps the other side of the scanning line.

7. The pixel electrode structure of claim 1, wherein the shielding electrode and the pixel electrode are made of the same material.

8. A pixel electrode structure, comprising:
   a plurality of data lines disposed on a substrate in parallel, wherein a pixel area is defined by the adjacent data lines;
   a pixel electrode disposed in the pixel area;
   a scanning line disposed on the substrate and intersecting the data lines, wherein the scanning line crosses over the pixel electrode or is disposed between the adjacent pixel electrodes;
   an active element disposed in the pixel area, which comprises a gate electrode, a source electrode and a drain electrode, wherein the gate electrode is electrically connected to the scanning line, the source electrode is electrically connected to the data lines, and the drain electrode is electrically connected to the pixel electrode; and a shielding electrode electrically connected to the pixel electrode with a first connecting part, wherein the first connecting part is disposed at a junction between liquid crystals having different tilt directions in the pixel area, wherein the shielding electrode further comprises a first shielding part and a second shielding part, and the first shielding part overlaps one side of the scanning line while the second shielding part overlaps the other side of the scanning line.

9. The pixel electrode structure of claim 8, wherein at least one side of the first shielding part or the second shielding part has a jag structure.

10. A display panel, comprising a pixel electrode structure which comprises:

at least one scanning line disposed on a substrate;

at least one data line disposed on the substrate and intersecting the scanning line to define a pixel area;

a pixel electrode disposed in the pixel area;

an active element comprising a gate electrode, a source electrode and a drain electrode, wherein the gate electrode is electrically connected to the scanning line, the source electrode is electrically connected to the data line, and the drain electrode is electrically connected to the pixel electrode; and a shielding electrode overlapping one side of the scanning line and electrically connected to the pixel electrode with a first connecting part, wherein the shielding electrode has a jag structure, and the first connecting part is disposed at a junction between jags of the jag structure protruding in different orientations.

* * * * *